United States Patent [19]
Weill et al.

[11] Patent Number: 6,031,881
[45] Date of Patent: Feb. 29, 2000

[54] METHOD FOR MITIGATING MULTIPATH EFFECTS IN RADIO RANGING SYSTEMS

[76] Inventors: Lawrence Weill, 100 Surf Pl., Seal Beach, Calif. 90740; Benjamin Fisher, 1110 Tamarisk Dr., Anaheim, Calif. 92807-5133

[21] Appl. No.: 08/934,493

[22] Filed: Sep. 19, 1997

Related U.S. Application Data

[60] Provisional application No. 60/026,318, Sep. 19, 1996.
[51] Int. Cl.[7] ................................................ H03D 1/00
[52] U.S. Cl. ........................ 375/341; 375/343; 342/386
[58] Field of Search .................................. 375/341, 343, 375/316, 340; 342/386

[56] References Cited

U.S. PATENT DOCUMENTS

| | | | |
|---|---|---|---|
| 4,821,294 | 4/1989 | Thomas, Jr. | 375/343 |
| 5,056,106 | 10/1991 | Wang et al. | 375/200 |
| 5,414,729 | 5/1995 | Fenton | 375/209 |
| 5,694,416 | 12/1997 | Johnson | 375/206 |

OTHER PUBLICATIONS

"Performance Evaluation of the Multipath Estimating Delay Lock Loop" by Townsend, et al. No date.
"Leica's Code and Phase Multipath Mitigation Techniques" by Hatch, et. al.
"Evaluation of GNSS Receiver Correlation Processing Techniques for Multipath and Noise Mitigation" by Van Dierendonck, No date.

*Primary Examiner*—Stephen Chin
*Assistant Examiner*—Lenny Jiang
*Attorney, Agent, or Firm*—Price, Gess & Ubell

[57] ABSTRACT

This invention involves a method for mitigating multipath effects in radio ranging systems which is based on searching for and finding a maximum likelihood estimate of range for a received signal in a signal ranging system. In determining the maximum likelihood estimate, the correlation process uses a high resolution step method in processing the received signal sample values to develop an estimation statistic. The estimation statistic using the correlations of the received signal is based on a new derived representative set of coefficients formed from a nonlinear combination of parameters of the received signal transformed into an invertible linear combination which allows solution of the maximization process of the estimation statistic. Additionally there is a method of constraining the relative amplitude of received secondary signals to obtain a refinement of the optimal solution of range. Also the method includes a process to reduce the magnitude of the processing required by the receiver by reducing the size of the overall sample of the signal that must be managed by the receiver. The method may be used in a signal environment where multiple secondary path signals are received by the signal ranging system.

8 Claims, 6 Drawing Sheets

METHOD FOR MITIGATING MULTIPATH EFFECTS IN RADIO RANGING SYSTEMS

This patent application is copending with Provisional Application Ser. No. 60/026,318, Filed on Sep. 19, 1996, with inventors Lawrence Weill and Benjamin Fisher for which priority is claimed.

BACKGROUND OF THE INVENTION

1. Field of the Invention

This invention relates to signal transmission ranging systems such as radar, sonar, positioning systems and the like. The new method provides a means to reduce system errors caused by reception of secondary path signals from reflecting surfaces.

2. Description of Related Art

Radio ranging systems use the time of propagation of radio signals to obtain the range (distance) between points of interest. A now classic example of this is radar. With radar the observed time of the transmitted radar signal in propagating to the target and returning to the radar receiver, then scaled by the speed of propagation, accomplishes ranging. Sonar is a direct acoustic analog of radar and is included as a ranging system also amenable to application of the subject invention. With the Global Positioning System, GPS, or GPS-like satellite positioning systems the time at which a satellite signal is received is compared to the time the satellite transmitted that signal, information available to the user, and then scaled by propagation speed to obtain range from satellite to receiver. In satellite positioning systems user's position is the information generally desired and is obtained by exploiting understood trilateration techniques using the inferred ranges to a constellation of satellites whose positions in space are a priori known.

In radio and acoustic ranging systems a commonly observed effect occurs due to the reception of one or more secondary path signals associated with reflecting surfaces positioned to provide those signals. In television, multipath, the term used to denote this phenomenon, manifests as undesired echoes or ghosts of the image transmitted. In radio ranging systems multipath manifests as errors in range which cannot be directly compensated unless the parameters of the multipath signal are known. Although, the effect of multipath signals is generally deleterious in radar and sonar the information on the multipath signals has been used to assist in defining target position. To illustrate the severity of multipath effects in an exemplary radio ranging system, GPS, the ranging error incurred due to multipath, with and without the use of a current state-of-the-art technique to reduce those effects, is shown in FIG. 1.

Multipath interference is coherent, or nearly so, with respect to the direct path signal, i.e., it has the same or very nearly the same spectrum as the direct path signal. For that reason it is particularly difficult to mitigate its effects; filtering and other such commonly used means in the art of suppressing undesired signals are ineffective with multipath.

A number of methods have been put to use with modest success to mitigate multipath effects in radar and GPS. The simplest is the use of a signal receiving antenna that substantially reduces the response of the receiving apparatus to wavefronts originating from the presumed direction of the reflected signal. When the direct and reflected signals arrive at the antenna from the same or nearly the same direction there is experienced an undesired degradation of the receiving apparatus response to the direct path signal, an effect which can seriously compromise ranging performance.

More significant for mitigating multipath effects are methods broadly described as algorithmic. One of the known multipath mitigation algorithms now in use demonstrates a performance described by the algorithm designers shown in FIG. 1. As described in the literature, the technique employs methods for decomposing the signal correlation function to permit inferring the multipath parameters: wavefront intensity, path separation delay, and path phase shift, of the primary multipath wavefront relative to the direct path wavefront, and thereby backing out or removing its effects on the measurement of the direct path delay. This and other such algorithms are now implemented in receivers which incorporate microprocessors or special purpose computing apparatus to execute code embodying these algorithms.

The present invention method or process to multipath mitigation in GPS or radar or sonar receivers or other similarly intended ranging systems implements a substantially different method of operation than cited above and provides an improved level of performance, in fact, near, or at, the limiting bounds of performance and with a substantially reduced computational burden. This is a crucial result because it makes feasible in practice obtaining accuracies of position fixes not heretofore achievable, thereby allowing numerous applications in the fields of radar, sonar and GPS or GPS-like satellite positioning systems not otherwise feasible. In sum, the accuracy achieved with the subject invention exceeds the accuracy achieved by the current art by a substantial factor. The computational efficiency with the invention permits achieving this level of performance with a parsimony of computational apparatus not achieved in the present art.

SUMMARY OF THE INVENTION

One object of the invention is to reduce the method of finding maximum likelihood estimates of range in signal transmission and receiving ranging systems in the presence of multipath signals to a two dimensional search process practical to conduct in equipment with limited computation capability by reducing the number of signal samples required in forming signal/modulation cross-correlations and to reduce the multiplication rate and thereby the computational burden of the processor to efficiently determine the estimation statistic. A further object is to provide an improved measure of range in the presence of multipath signals with minimal compromise of performance in the absence of multipath signals.

In accordance with the description presented herein, other objectives of this invention will become apparent when the description and drawings are reviewed.

DESCRIPTION OF THE PREFERRED EMBODIMENT

Figure 1:
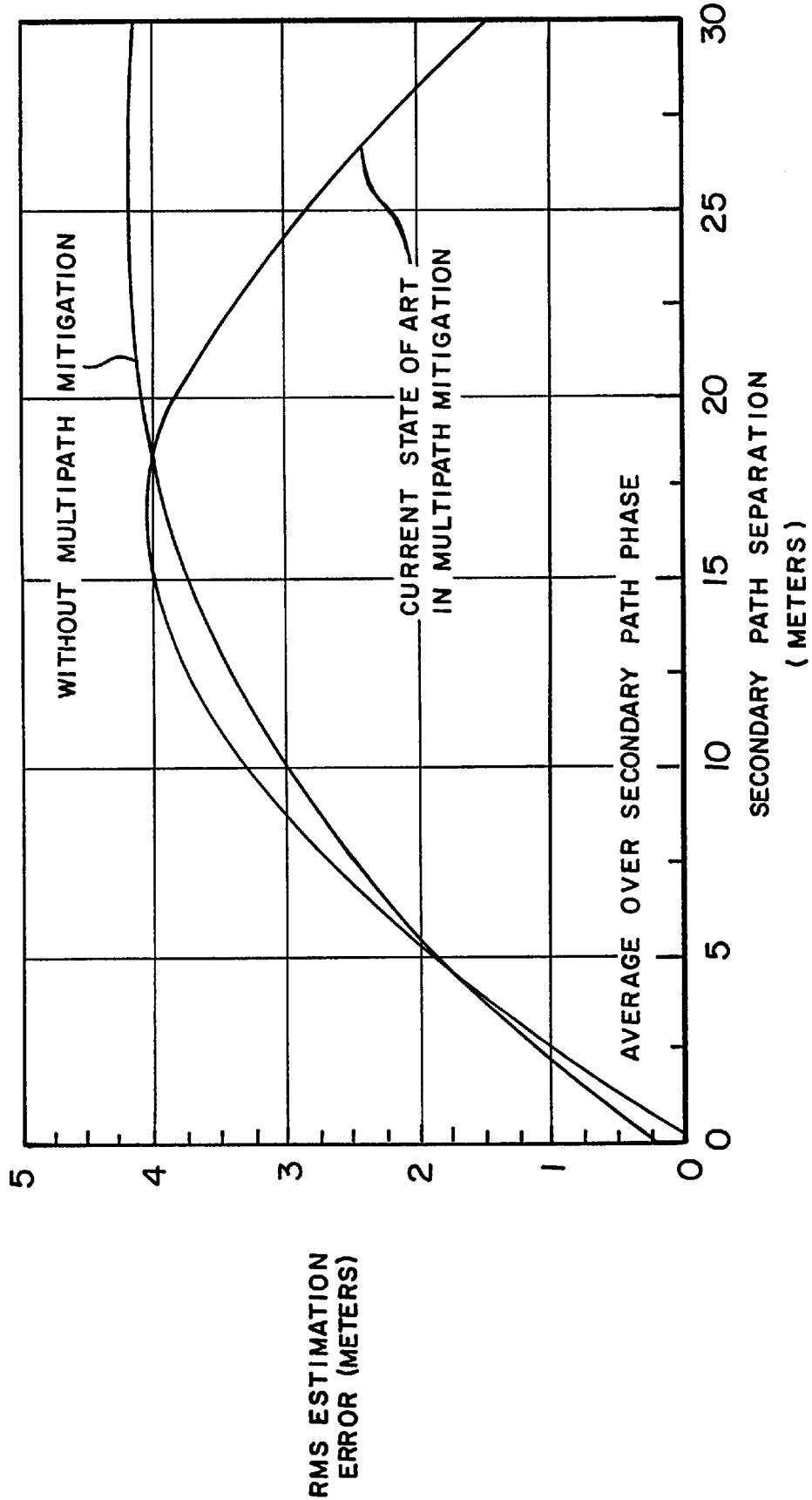
FIG. 1 illustrates the current art error correction statistic in the presence of multipath signals.

Before describing the operation of the new process it is useful to provide a brief description of the current art of estimating signal delay as applied to GPS equipment. Let $$s(t)=A_s m(t) \sin(\omega_s t) \qquad (1)$$

denote the GPS satellite ranging signal, where $A_s$ is the amplitude of the transmitted signal, m(t) the signal modulation which in GPS and some radars m(t) is a pseudo-noise coded cyclical waveform, and $\omega_s$ is the angular frequency of the signal carrier. This signal will be scaled due to propagation losses, delayed due to propagation delays, and Doppler shifted due to receiver and satellite range components of motion when observed at the receiver. There will also be observed thermally induced white noise, with power spectral density denoted by $N_o$ depending on the receiver noise figure, in the receiving apparatus front end competing with this signal all together which results in the observed signal $$r(t)=Am(t-\tau)\sin(\omega_r t+\theta)+n(t);\ t_0 \leq t \leq t_0+T. \qquad (2)$$

where n(t) denotes the competing noise, A the received signal amplitude, $\tau$ the satellite-to-receiver signal delay, $\omega_r$ the Doppler shifted carrier frequency, $\theta$ the phase shift of this carrier and where $t_0$ is an arbitrary the starting time of the interval of observation.

The process for estimating $\tau$ optimally, in a sense to be described, is to form the cross-correlation of the received signal with an artificially delayed and Doppler shifted replica of the transmitted signal where the delay and Doppler shift are chosen to maximize the correlation. Such structure is referred to as a replica correlator. Clearly each different noise waveform will bring about a different delay and Doppler estimate and consequently a correspondingly different inferred position where each inferred position almost certainly will be different than the actual position. The statistics of the variations of the delay estimates are of particular interest and concern in applications. If the average of the delay estimates is the same as the actual signal delay the estimates are unbiased. The average of the square of the variations from this value if the average is unbiased is the variance. These error types may be combined into one measure: the sum of the variance and the square of the bias, referred to as the mean square error. The square root of mean square error, or root mean square, rms, value, is most generally presented, since it has the physical significance of the variables it derives from. An optimal estimator produces unbiased, minimum variance estimates. That is very nearly precisely what the replica correlator accomplishes under the conditions where equation (2) applies, that is, where no multipath is present. Where multipath is present the replica correlator is not optimal as evidenced by the graphs of FIG. 1.

It is inconvenient to form the correlation function on the signal directly observed as is described by equation (2) for two reasons; its spectrum is centered about the carrier which makes inconvenient the transformation of this signal to a discretized form suitable for digital computer processing, and the Doppler shift is present and may be unknown. In the current GPS art what is commonly done at the receiver to avoid these problems is to use a voltage sensitive local oscillator or equivalent to track the Doppler shifted carrier frequency. This is then used, as in homodyne radio receivers, to translate the received signal to base band. Also involved in this process is a modulation tracking loop which is known in the art and not the subject of this invention. Further, the invention herein described assumes these functions are performed. The translator operates to preserve the essential ranging information carried by the received signal. It does this by generating a sinusoid and cosinusoid, both in synchronism with the Doppler shifted carrier, and uses these in concert with non critical low-pass filters to generate two base band signals often referred to as the I and Q, in-phase and quadrature, channel signals. As is well understood in the art these are mathematically equivalent to a complex valued signal with corresponding real and imaginary parts given by $$\tilde{I}_R(t)=Am(t-\tau)\cos(\theta)+\tilde{n}_R(t)$$

$$\tilde{I}_I(t)=Am(t-\tau)\sin(\theta)+\tilde{n}_I(t), \qquad (3)$$

equivalent to the complex valued signal $$\tilde{I}(t)=Ae^{j\theta}m(t-\tau)+\tilde{n}(t). \qquad (4)$$

The base band signal has range information bearing spectral content restricted to the modulation and therefore may be conveniently sampled and converted to a digital format suitable for digital computer processing. That no information is lost if the sampling rate does not fall below the modulation bandwidth is well understood in the art. Also, that the cross correlation is the optimal estimation statistic can be shown by inspection of the generalized likelihood function. The generalized likelihood function is the conditional probability density of the observations, $\tilde{r}(t)$ suitably discretized, given estimates of the unknown signal related parameters of amplitude, A, phase, $\theta$, and delay, $\tau$, and can be written as $$P_{\tilde{r};\hat{A},\hat{\theta},\hat{\tau}} = k\exp\left[\frac{2}{N_o}\hat{A}\left[\cos\hat{\theta}\int_{t_0}^{t_0+T}\tilde{r}_R(t)m(t-\hat{\tau})dt + \sin\hat{\theta}\int_{t_0}^{t_0+T}\tilde{r}_I(t)m(t-\hat{\tau})dt\right]\right] \qquad (5)$$

where k denotes a probability normalizing constant. If certain conditions apply, which will be described, the optimal estimates of the unknown parameters are that set which maximizes this function, or equivalently the exponent $$\Lambda = \frac{2}{N_o}\hat{A}\left[\cos\hat{\theta}\int_{t_0}^{t_0+T}\tilde{r}_R(t)m(t-\hat{\tau})dt + \sin\hat{\theta}\int_{t_0}^{t_0+T}\tilde{r}_I(t)m(t-\hat{\tau})dt\right] \qquad (6)$$

of the exponential and are referred to as maximum likelihood, ML, estimates. As is known in the art ML estimates are, with increasing observation time, asymptotically unbiased and minimum variance, which strongly motivates ML estimation. In order to obtain an optimum ranging estimate in this sense, an ML estimate of signal delay is desired. The carrier phase, as well as signal amplitude are nuisance parameters in this process. Carrier phase may be eliminated from consideration by use of the following technique. If a function is differentiable it is necessary that its derivatives be zero at its extremal values. Therefore a necessary condition for an extremal, in this case a maximum, is that $$0 = \frac{\partial \Lambda}{\partial \hat{\theta}} = \frac{2\hat{A}}{N_o}\left[-\sin\hat{\theta}\int_{t_0}^{t_0+T}\tilde{r}_R(t)m(t-\hat{\tau})dt + \right. \qquad (7)$$

-continued $$\cos\hat{\theta}\int_{t_0}^{t_0+T}\tilde{r}_I(t)m(t-\hat{\tau})dt\Bigg],$$

which has two solutions given by $$\sin\hat{\theta} = \frac{\int_{t_0}^{t_0+T}\tilde{r}_I(t)m(t-\hat{\tau})dt}{\left|\int_{t_0}^{t_0+T}\tilde{r}(t)m(t-\hat{\tau})dt\right|}, \quad (8)$$

$$\cos\hat{\theta} = \frac{\int_{t_0}^{t_0+T}\tilde{r}_R(t)m(t-\hat{\tau})dt}{\left|\int_{t_0}^{t_0+T}\tilde{r}(t)m(t-\hat{\tau})dt\right|},$$

and $$\sin\hat{\theta} = -\frac{\int_{t_0}^{t_0+T}\tilde{r}_I(t)m(t-\hat{\tau})dt}{\left|\int_{t_0}^{t_0+T}\tilde{r}(t)m(t-\hat{\tau})dt\right|}, \quad (9)$$

$$\cos\hat{\theta} = -\frac{\int_{t_0}^{t_0+T}\tilde{r}_R(t)m(t-\hat{\tau})dt}{\left|\int_{t_0}^{t_0+T}\tilde{r}(t)m(t-\hat{\tau})dt\right|}.$$

The first solution, equation (8), corresponds to a maximum, the second, equation (9), to a minimum. Substituting equation (8) corresponding to the maximum into equation (6) results in $$\Lambda = \frac{2\hat{A}}{N_o}\left|\int_{t_0}^{t_0+T}\tilde{r}(t)m(t-\hat{\tau})dt\right|^2 \quad (10)$$

The delay parameter $\hat{\tau}$ that maximizes the magnitude of the cross correlation function $\int\tilde{r}(t)m(t-\hat{\tau})dt$ also maximizes $\Lambda$ for any $\hat{A}$. The derivation of equation (10) completes the demonstration that the cross correlation function is the statistic which permits obtaining an optimal, in the ML sense, estimate of the delay parameter from observations over the stated interval on r(t), in the case when no multipath is present.

In digital implementations the signal/modulation correlations desired are the sum of the products of corresponding samples of the observed signal real and imaginary parts and the delayed modulation. Means of artificially generating samples of arbitrarily delayed modulation waveforms are well known in the art and may be described succinctly as follows. Sample values of the modulation waveform are generated using a priori knowledge of the modulation waveform. Using this information samples of the modulation may be formed as for instance by Fourier methods at any arbitrary set of times including those corresponding to the waveform delayed by any arbitrary amount.

When multipath is present the observed signal will consist of the additive combination of each signal component, i.e., added to the direct path observed signal will be the various reflected signals. Each of these reflected signals can be described with exactly the same parameters, amplitude, phase, and delay as the direct path signal. In the simplest case where only one secondary signal is operating, the case most commonly addressed in the art, the base band signal observed can be expressed as $$\tilde{r}(t)=Ae^{j\theta}[m(t-\tau)+\alpha e^{j\phi}m(t-\tau-\Delta\tau)]+\tilde{n}(t), \quad (11)$$

where, as in the non-multipath case, $\theta$ represents the direct path carrier phase and A its amplitude. $\alpha$ represents the relative amplitude of the reflected signal and $\phi$ its carrier phase relative to the direct path carrier phase. Also, as in the non-multipath case, $\tau$ represents the delay of the direct path signal. $\Delta\tau$ represents the additional delay of the reflected signal, which we refer to herein as the path separation. Because reflected signals must propagate over greater distances than direct path signals, $\Delta\tau$ must be a positive quantity. Only in special, generally contrived, circumstances will the intensity of a reflected wave exceed that of the incident wave; therefore, most generally the relative amplitude of the observed reflected signal, $\alpha$, will be less than unity.

In the multipath case the generalized likelihood function is given by $$P_{\tilde{r}|\hat{A},\hat{\theta},\hat{\tau},\hat{\alpha},\hat{\phi},\Delta\hat{\tau}} = k\exp\left[-\frac{2}{N_o}\int_{t_0}^{t_0+T}\Big|\tilde{r}(t) - \hat{A}e^{j\hat{\theta}}[m(t-\hat{\tau}) + \hat{\alpha}e^{j\hat{\phi}}m(t-\hat{\tau}-\Delta\hat{\tau})]\Big|^2 dt\right] \quad (12)$$

where, as in the non-multipath case, k denotes a probability normalizing constant. Here we have a substantially more complicated maximization problem than with no multipath, involving not only the direct path and path separation delay estimates, $\hat{\tau}$ and $\Delta\hat{\tau}$, but also the four parameters $\hat{A}$, $\hat{\theta}$, $\hat{\alpha}$, and $\hat{\phi}$ which, in the context of the desired objective, are referred to as nuisance parameters. The obvious solution is to search over the feasible range of all six of these parameters until a global maxima is obtained. Six dimensional searches present an impractical computational burden. Normally methods similar to the one presented in the non-multipath case are used to derive an alternative estimation statistic free of the nuisance parameters. This can be done successfully for two of the parameters, carrier phase $\hat{\theta}$ and amplitude $\hat{A}$ resulting in the estimation statistic $$\Lambda = \frac{\left|\int_{t_0}^{t_0+T}\tilde{r}(t)\Big[m(t-\hat{\tau}) + \hat{\alpha}e^{j\hat{\phi}}m(t-\hat{\tau}-\Delta\hat{\tau})\Big]dt\right|^2}{\int_{t_0}^{t_0+T}\Big|m(t-\hat{\tau}) + \hat{\alpha}e^{j\hat{\phi}}m(t-\hat{\tau}-\Delta\hat{\tau})\Big|^2 dt} \quad (13)$$

thereby reducing the search process to four dimensions in the parameters $\alpha$, $\hat{\phi}$, $\hat{\tau}$, and $\Delta\hat{\tau}$. In order to further attempt to reduce the computational burden, the remaining two nuisance parameters $\hat{\alpha}$ and $\hat{\phi}$ could be eliminated by the same means, i.e., setting derivatives with respect to these parameters to zero and finding solutions which can be used to eliminate these parameters in the resulting estimation statistic. Unfortunately this results in a pair of analytically intractable non-linear, transcendental equations potentially solvable only by numerical means and with an attendant substantial computational burden.

The first process of this invention is based on reducing the estimation statistic by deductive means involving nonobvious transformations to an expression involving only the delay and path separation parameters. This then reduces the problem of finding ML estimates of delay and path separation, the kernel information desired to extract from the signal observations, to a two dimensional search practical to conduct with contemporary microprocessors or other similar computational elements. In order to describe this statistic it is necessary to define two functions; one is the cross-correlation of the observed signal with the modulation waveform $$R(\hat{\tau}) = \int_{t_0}^{t_0+T} \tilde{r}(t)m(t-\hat{\tau})dt, \quad (14)$$

identical to the cross correlation function employed in the non-multipath case and the other is the autocorrelation function of the modulation $$K(\hat{\tau}) = \int_{t_0}^{t_0+T} m(t)m(t-\hat{\tau})dt. \quad (15)$$

Since the receiver has complete knowledge of the transmitted waveform, $K(\hat{\tau})$ is an a priori known function which may be generated and stored in the receiver in tabular form.

There are situations in which the receiver might distort the modulating function by introducing phase variations observed at baseband not originally contained in the real valued model of m(t) described in equation (1). The resulting departure from the assumed real valued model can degrade the performance of the maximum likelihood direct path delay estimates. This problem can be mitigated, however, by using a complex valued model for m(t) in equation (11) which in practice can be determined from measurements made on the receiver used.

Using the correlation functions described by equations (14) and (15) the estimation statistic implemented in this invention can be described by $$\Lambda = 2Re[(a-jc)R(\hat{\tau})] + 2Re[(b-jd)R(\hat{\tau}+\hat{\Delta\tau})] - 2(ab+cd)K(\hat{\Delta\tau}) - (a^2+b^2+c^2+d^2)K(0) \quad (16)$$

where Re means real part, and where the quantities a,b,c, and d resulting from transformations of the nuisance parameters $\hat{A}$, $\hat{\alpha}$, $\hat{\theta}$, and $\hat{\phi}$ and functions thereof are given by $$a = \frac{(K(0) - 2\gamma_i)R_R(\hat{\tau}) - K(\hat{\Delta\tau})R_R\left(\hat{\tau} + \hat{\Delta\tau}\right)}{K^2(0) - K^2(\hat{\Delta\tau}) - 4\gamma_i}, \quad (17)$$

$$b = \frac{(K(0) - 2\gamma_i)R_R(\hat{\tau} + \hat{\Delta\tau}) - K(\hat{\Delta\tau})R_R(\hat{\tau})}{K^2(0) - K^2(\hat{\Delta\tau}) - 4\gamma_i},$$

$$c = \frac{(K(0) - 2\gamma_i)R_I(\hat{\tau}) - K(\hat{\Delta\tau})R_I\left(\hat{\tau} + \hat{\Delta\tau}\right)}{K^2(0) - K^2(\hat{\Delta\tau}) - 4\gamma_i},$$

$$d = \frac{(K(0) - 2\gamma_i)R_I\left(\hat{\tau} + \hat{\Delta\tau}\right) - K(\hat{\Delta\tau})R_I(\hat{\tau})}{K^2(0) - K^2(\hat{\Delta\tau}) - 4\gamma_i},$$

with $\gamma_i$; i=0, a term used later, set to zero. It is observed that the expression on the right side of equation (16) depends only on the direct path delay estimate, $\hat{\tau}$, and path separation estimate, $\hat{\Delta\tau}$, and hence reduces the problem of estimating direct path delay and path separation to two dimensions. This technique is readily extensible to the general case of a multiplicity of reflections competing with the direct path signal.

The foregoing has assumed an ideal or near ideal behavior of the receiver. Often the receiver exhibits nonlinear response and this gives rise to use of a complex valued replica to achieve performance levels more nearly obtained with ideally behaving receivers.

In the next stage of the process a method to introduce constraints on the parameter $\hat{\alpha}$ into the $\hat{\tau}$, $\hat{\Delta\tau}$ ML estimation search process are introduced. Since a is almost always never more than unity such constraint provides improved estimation results as compared to the unconstrained results. This constraint is accomplished as follows. Let $\alpha_c$ denote the desired maximum value constraint on $\alpha$. First, after having completed the $\hat{\tau}$, $\hat{\Delta\tau}$ search process for the maximum value of $\Lambda$ and using equation (17) with the values of $\hat{\tau}$, $\hat{\Delta\tau}$ corresponding to the maximum value of $\Lambda$, compute $$\hat{\alpha}^2 = \frac{b^2 + d^2}{a^2 + c^2}. \quad (18)$$

If $\hat{\alpha}^2$ is not greater than $\alpha_c^2$ then $\hat{\tau}_{ML}$, $\hat{\Delta\tau}_{ML}$ are the values corresponding to the maximum of $\Lambda$. If $\hat{\alpha}^2$ is greater than $\alpha_c^2$ determine the quantities $$X = |R(\hat{\tau})|^2 \alpha_c^2 + |R(\hat{\tau} + \hat{\Delta\tau})|^2 \alpha_c^4 \quad (19)$$

$$Y = 2(K(\hat{\Delta\tau})Re[R^*(\hat{\tau})R(\hat{\tau} + \hat{\Delta\tau})] - K(0)|R(\hat{\tau})|^2 \alpha_c^2)$$

$$Z = K^2(0)|R(\hat{\tau})|^2 \alpha_c^2 + K^2(\hat{\Delta\tau})|R(\hat{\tau} + \hat{\Delta\tau})|^2 -$$

$$4K(0)|K(\hat{\Delta\tau})Re[R^*(\hat{\tau})R(\hat{\tau} + \hat{\Delta\tau})] +$$

$$K^2(0)|R(\hat{\tau})|^2 + K^2(\hat{\Delta\tau})|R(\hat{\tau})|^2$$

where, again, $\hat{\tau}$, $\hat{\Delta\tau}$ have maximized $\Lambda$. Then use these to compute $$\gamma_i = \frac{-Y + (-1)^i \sqrt{Y^2 - 4XZ}}{2X}; \quad i = 1, 2. \quad (20)$$

for i=1 and 2. Recompute a,b,c, and d first with $\gamma_1$ and then with $\gamma_2$. With each set of the coefficients a,b,c,d evaluate the estimation statistic $\Lambda$ using equation (16). Choose the largest resulting value. This is the value of the estimation statistic incorporating the constraint $\hat{\alpha} \leq \alpha_c$ for any particular pair of direct path delay, $\hat{\tau}$, and path separation, $\hat{\Delta\tau}$, estimates. The pair of estimates $\hat{\tau}_{ML}$ and $\hat{\Delta\tau}_{ML}$ that generate the largest value of the estimation statistic are the ML estimates of $\tau$ and $\Delta\tau$.

The estimation statistic given by equation (16) is unimodal. This property allows the search for those values of $\hat{\tau}$ and $\hat{\Delta\tau}$ that maximize it to be accomplished in a directed and therefore computationally efficient manner. Starting with an arbitrary selection of $\hat{\tau}$ and $\hat{\Delta\tau}$ increase or decrease these values according to which of the neighboring values produces a larger value of the estimation statistic. Continue this process iteratively until neighboring values cease to increase. That pair of values of $\hat{\tau}$ and $\hat{\Delta\tau}$ are the ML estimates, $\hat{\tau}_{ML}$ and $\hat{\Delta\tau}_{ML}$, of $\tau$ and $\Delta\tau$.

Finally, a method to obtain ML estimates of the parameters A, $\theta$, $\alpha$, and $\phi$, the direct path amplitude and phase and the secondary path relative amplitude and relative phase is provided. In certain ranging systems such as radar and in GPS positioning this information can be useful, as was indicated earlier in this disclosure.

Use the quantities a, b, c, and d corresponding to the ML estimates of $\tau$ and $\Delta\tau$, $\hat{\tau}_{ML}$ and $\hat{\Delta\tau}_{ML}$, obtained at convergence of the search process described above to first obtain $$\hat{A}_{ML} = \sqrt{a^2 + c^2}, \quad (21)$$

and $$\hat{\theta}_{ML} = \frac{\pi}{2}[1 - \text{sgn}(a)]\text{sgn}(c) + \tan^{-1}\left(\frac{c}{a}\right), \quad (22)$$

where sgn(·) means sign of the quantity in the parentheses. Then use these results to obtain $$\hat{\alpha}_{ML} = \frac{\sqrt{b^2 + d^2}}{\hat{A}_{ML}}, \quad (23)$$

and $$\hat{\phi}_{ML} = \frac{\pi}{2}[1 - \text{sgn}(b)]\text{sgn}(d) + \tan^{-1}\left(\frac{d}{b}\right) - \hat{\theta}_{ML}. \quad (24)$$

Figure 2:
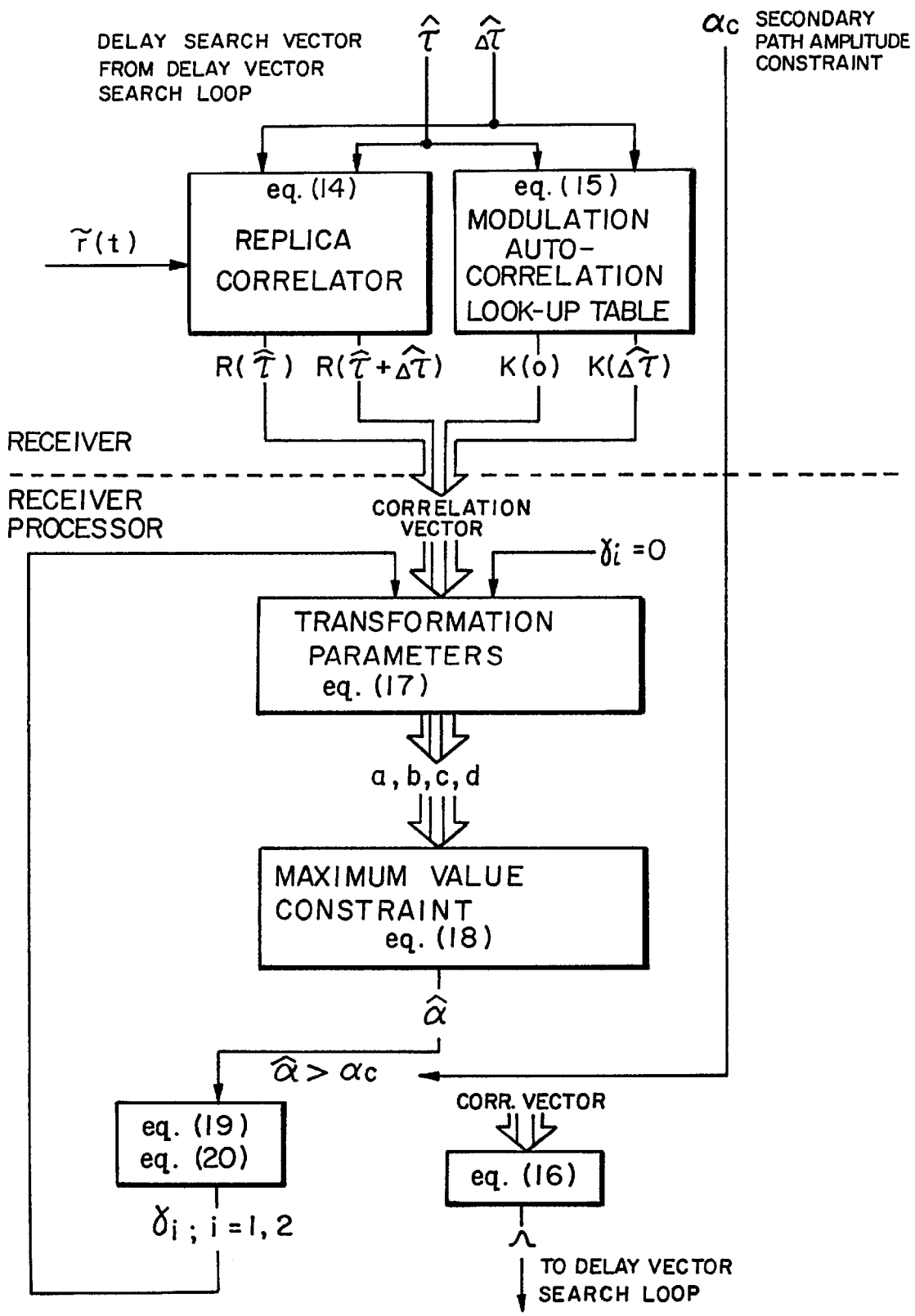
FIG. 2 illustrates the multipath mitigation method flow diagram.

The process as described above constitutes one kernel element of the multipath mitigation invention and is shown in flow chart form in FIG. 2.

Figure 3:
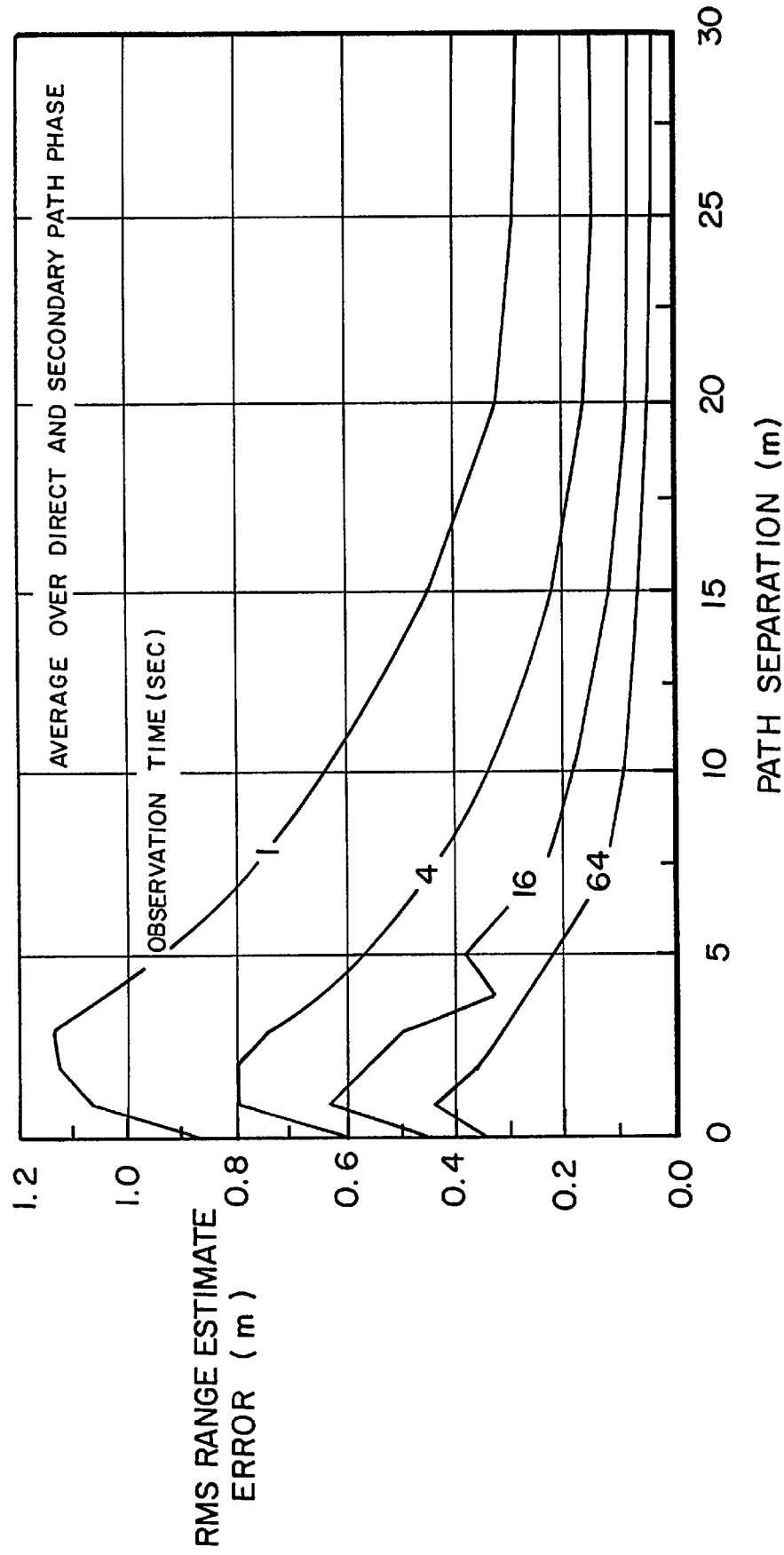
FIG. 3 illustrates the multipath mitigation process rms range estimate error.
Figure 4:
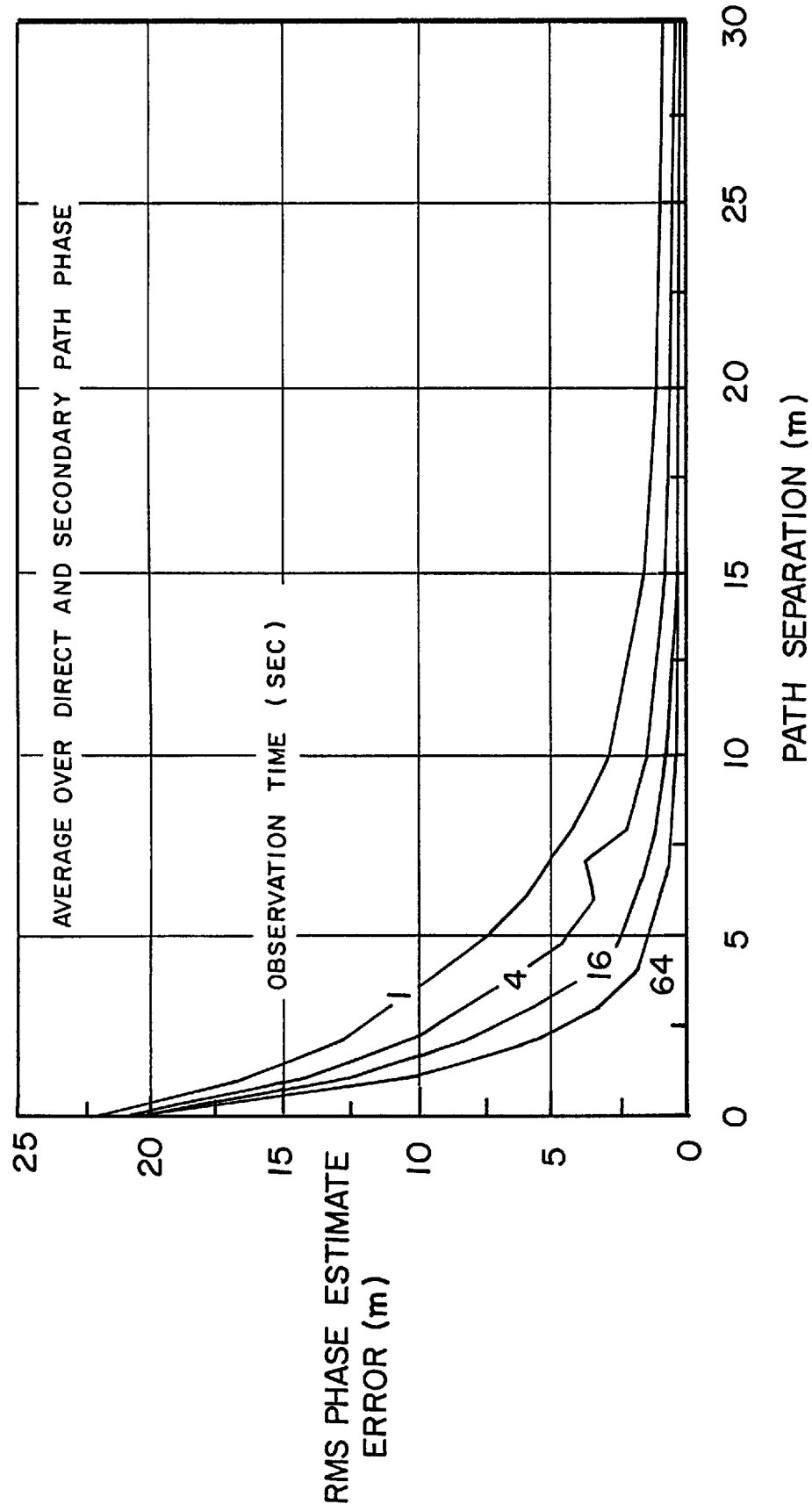
FIG. 4 illustrates the multipath mitigation process rms phase estimation error.

Its estimation performance in the context of GPS is shown in FIGS. 3 and 4 in which the direct path delay and phase estimation rms errors are shown under conditions comparable to those relating to FIG. 1.

It is noted from these figures that the rms estimation errors decrease with increasing signal observation time. In application, this favorable behavior permits controlling the deleterious effects of multipath to any desired level. This is in contrast to methods previously described herein as representative of the current art of multipath mitigation. With these methods, bias errors independent of signal observation time dominate the rms errors at relatively small path separation and therefore these methods are incapable of providing the same level of error control.

A second kernel element of this invention is a method to efficiently generate the signal/modulation cross-correlation values needed to determine the estimation statistic described by equation (16). In ranging systems the transmitted signals, optimized for ranging, are typically characterized by a large time-bandwidth product. A major problem is that conventional discrete, digital, means, as for example described here in connection with optimal range estimation in a non-multipath environment, are computation intensive, especially with regard to the number of multiplications per unit of time. Signal/modulation cross-correlations are formed by summing products of signal sample values with corresponding artificially delayed modulation sample values. In GPS, for example, this involves multiplications at a rate upwards of 20 million signal samples per second. In radar that rate can be substantially greater.

In GPS, radar and other signal ranging systems the modulation waveforms typically are synthesized from identically recurrent structural features whose shape and location are a priori known. Examples include, but are not limited to, frequency-hopping and pseudo-noise randomly coded waveforms as used in radar and GPS. These waveforms are characterized by recurring transients each with identical shape. With pseudo-noise codes the transients occur at each change in modulation polarity. With frequency hopping the transients occur at each frequency change. It is these transients and not the remaining portions of the signal waveform that convey the desired ranging information, and therefore signal samples in the remaining portions of the waveform do not materially contribute to the information desired. This is illustrated by the graphs displayed in FIG. 5 which show only a marginal decrease in the rms errors of range estimates with an increasing number of signal samples beyond a threshold value, as additional signal samples more distant from the transient are employed.

The first element of this aspect of the invention reduces the number of signal samples required in forming the signal/modulation cross-correlations by taking advantage of the fact of diminishing returns with increasing the use of the number of signal samples beyond those in the vicinity of the modulation transient. With the second element of this aspect of the invention the cross-correlation mathematical operations are restructured by averaging the recurring transient components of the signal and modulation waveforms over all occurrences of transients prior to multiplication of signal and delayed modulation sample values. Such averaging typically reduces the multiplication rate and therefore computation burden by 4 to 5 orders of magnitude.

In civilian GPS applications the carrier modulation waveform, called the C/A code, is a periodic waveform consisting of 1023 chips (pulses) of equal duration and uniform amplitude alternated in polarity over the repetition period of one millisecond in what appears to be a random distribution, but the resulting structure is entirely known at the signal receiver. The transitions between alternate polarity chips constitute the recurrent structure utilized advantageously in the invention.

Figure 5:
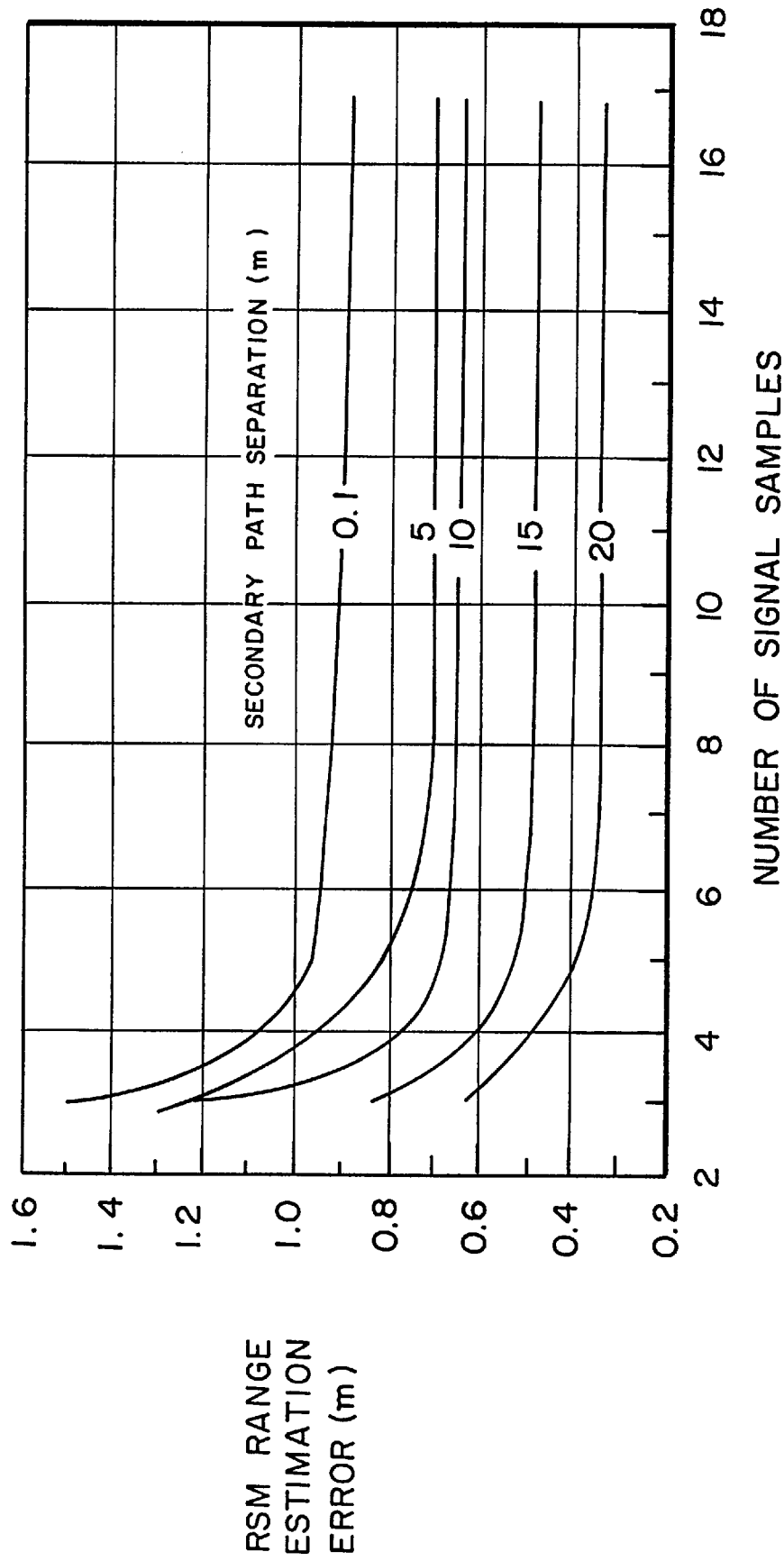
FIG. 5 illustrates the marginal effect of increasing sample data on rms range estimate error.

In GPS the receivers signal bandwidth is not uncommonly limited to 10.23 MHz. A minimum sampling rate in excess of 20.46 MHz is required to preserve ranging information carried by these signals. Thus, over the duration of signal observation time, commonly 1 second or greater, required to achieve acceptably high levels of accuracy in estimating direct path signal propagation delay, absent the use of the technique described here, in excess of 20 million signal sample values multiplications are required to be performed to extract the correlation information needed by the process. However, only regions of the code waveform in the vicinity of transitions contain range information. Because the C/A waveform is completely known, code tracking techniques well understood in the art can be employed to locate these transition regions. Further, these transitions are either negative or positive going, but with identical shapes. In the first element of this aspect of the invention corresponding samples collected from each transition region are brought into like polarity using the a priori known modulation waveform information and averaged over the observation interval; resulting thereby in a single subset of sample values bearing all the ranging information contained in the complete set. In the second element of this aspect of the invention the correlation of these with a corresponding subset of modulation waveform samples provides the desired correlation values. As shown in FIG. 5 only 7 sample values in this example are needed to provide essentially all the range related correlation information conveyed by the signal.

Figure 6:
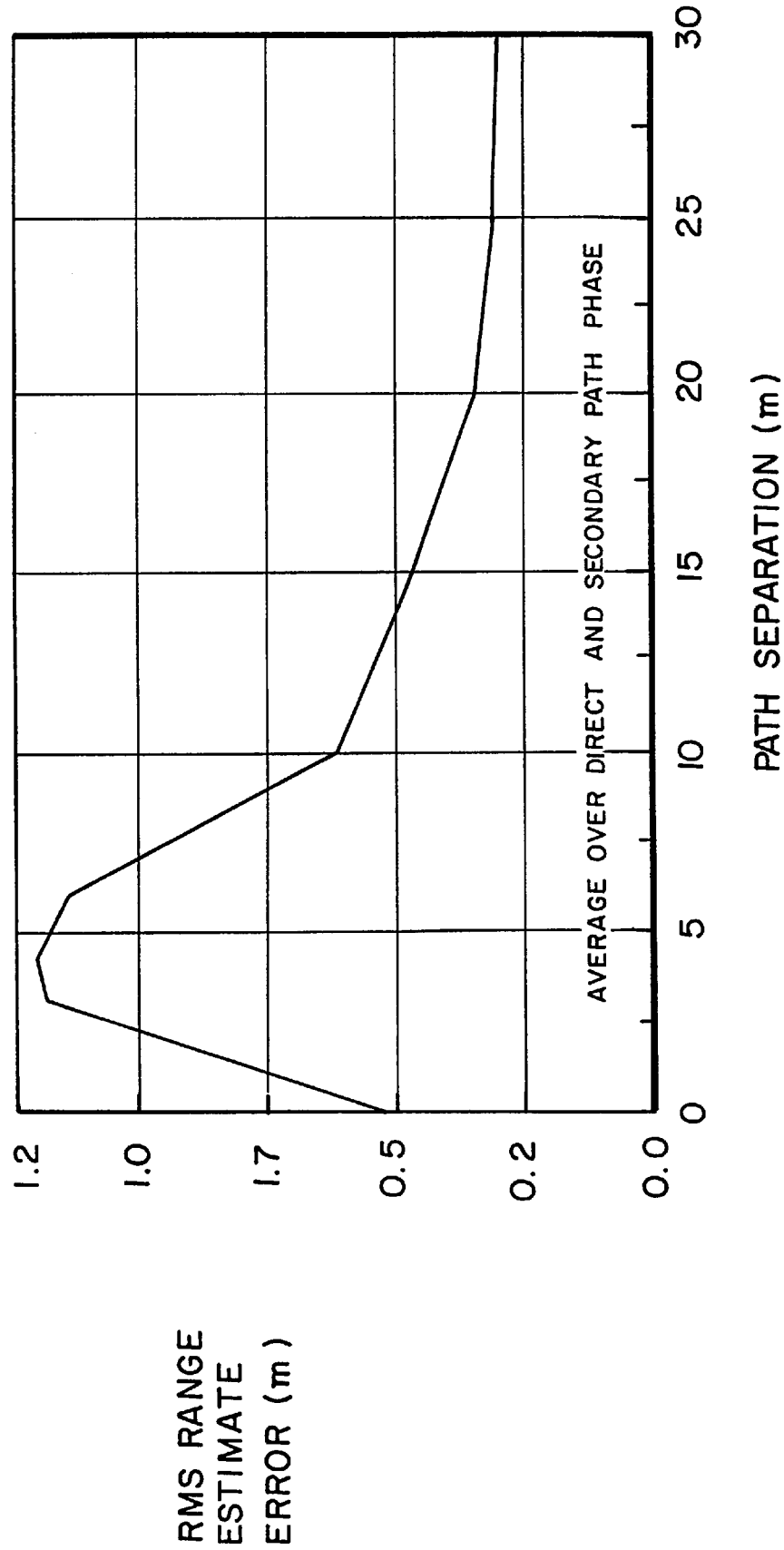
FIG. 6 illustrates the reduced direct path estimate uncertainty obtained.

When multipath signals are not present the optimum estimator of signal propagation delay is the replica correlator; and therefore it is not advantageous in that circumstance to use any multipath mitigation algorithm predicated on multipath present. Another aspect of this invention relates to means for improving the performance of the subject invention when multipath is not present. Such improvement is obtained by constraining the secondary path separation estimate to a minimum value which operates to reduce ambiguity of the various parameter estimates observed when the secondary path separation is small or when no multipath is present; thereby improving the direct path delay estimate. This is illustrated in FIG. 6 wherein the secondary path search values in the $\hat{\tau}$, $\hat{\Delta\tau}$ search process are constrained to a region of 10 meters or more. It is noted by comparison to FIG. 5 that a significant improvement in direct path delay estimate uncertainty is obtained when the secondary path separation is small, but with little sacrifice in estimate uncertainty for larger secondary path separations.

We claim:

1. A process for providing an optimal estimate of range in a signal ranging system, comprising the steps of:

receiving a transmitted signal having ranging information contained therein and including a secondary path signal, and translating a combined received signal to a baseband signal;

sampling the baseband signal synchronously with a modulation waveform creating a sampled baseband signal and combining successive repetitions of a plurality of range bearing information features of the sampled baseband signals;

correlating the combined sampled baseband signals and a plurality of artificially delayed representations of a known transmitted signal creating a plurality of received signal representations based on the range bearing information features of the sampled baseband signals;

computing a maximum likelihood estimate of range using selected pairs of received signal representations;

constraining the relative amplitude of the secondary path signal estimate based on knowledge of the transmitted signal environment; and computing a second maximum likelihood estimate of range while constraining the relative amplitude of the secondary path signal using the received signal representations.

2. The process as in claim 1 further including the step of:

computing the maximum likelihood estimates of a direct path amplitude, a direct path phase, a secondary path relative amplitude and a secondary path relative phase for the combined received signal for each secondary path signal.

3. The process as in claim 1 further including the step of:

constraining a path separation delay estimate to a minimum value based on knowledge of the transmitted signal environment.

4. The process as in claim 1 wherein the step of correlating the sampled baseband signal further comprising the steps of:

forming correlations of the combined received signal and the modulation waveform with a plurality of correlation processes using high resolution steps in the sample values of a direct path delay estimate and a path separation estimate; and developing an estimation statistic using the correlations of the combined received signal and the modulation waveform to form a representative set of coefficients with a variable $\gamma$ set to zero value and with high resolution values of the direct path delay estimate and the path separation estimate to search to find a maximum estimation statistic.

5. The process as in claim 4 wherein the representative set of coefficients is a nonlinear combination of parameters of the combined received signal transformed into an invertible linear combination described by the following equations:

$$\Lambda = 2Re[(a-jc)R(\hat{\tau})] + 2Re[(b-jd)R(\hat{\tau}+\Delta\hat{\tau})] - 2(ab+cd)K(\Delta\hat{\tau}) - (a^2+b^2+c^2+d^2)K(0) \quad (1)$$

where Re means real part, and where the quantities a,b,c, and d which are extensible for computation of a plurality of secondary components are given by with $\gamma_i$ at i=0, set to zero.

$$a = \frac{(K(0) - 2\gamma_i)R_R(\hat{\tau}) - K(\Delta\hat{\tau})R_R(\hat{\tau}+\Delta\hat{\tau})}{K^2(0) - K^2(\Delta\hat{\tau}) - 4\gamma_i}, \quad (2)$$

$$b = \frac{(K(0) + 2\gamma_i)R_R(\hat{\tau}+\Delta\hat{\tau}) - K(\Delta\hat{\tau})R_R(\hat{\tau})}{K^2(0) - K^2(\Delta\hat{\tau}) - 4\gamma_i},$$

$$c = \frac{(K(0) - 2\gamma_i)R_I(\hat{\tau}) - K(\Delta\hat{\tau})R_I(\hat{\tau}+\Delta\hat{\tau})}{K^2(0) - K^2(\Delta\hat{\tau}) - 4\gamma_i},$$

$$d = \frac{(K(0) + 2\gamma_i)R_I(\hat{\tau}+\Delta\hat{\tau}) - K(\Delta\hat{\tau})R_I(\hat{\tau})}{K^2(0) - K^2(\Delta\hat{\tau}) - 4\gamma_i}.$$

6. The process as in claim 5 wherein the step of constraining the relative amplitude includes the steps of:

solving for a relative amplitude estimate of the secondary path signal using the values of the direct path delay estimate and the path separation estimate which maximize the estimation statistic; and comparing the constrained relative amplitude of the combined received signal to a selected parameter $\alpha_c$ which if it is less than in value accept the solution for the direct path delay estimate and the path separation estimate and if not less than in value then compute functions X, Y and Z using selected pairs of the received signal representations of the correlation results according to the following equations $$X = |R(\hat{\tau})|^2\alpha_c^2 + |R(\hat{\tau}+\Delta\hat{\tau})|^2\alpha_c^4 \quad (3)$$

$$Y = 2(K(\Delta\hat{\tau})Re[R^*(\hat{\tau})R(\hat{\tau}+\Delta\hat{\tau})] - K(0)|R(\hat{\tau})|^2\alpha_c^2)$$

$$Z = K^2(0)|R(\hat{\tau})|^2\alpha_c^2 + K^2(\Delta\hat{\tau})|R(\hat{\tau}+\Delta\hat{\tau})|^2 -$$

$$4K(0)K(\Delta\hat{\tau})Re[R^*(\hat{\tau})R(\hat{\tau}+\Delta\hat{\tau})] +$$

$$K^2(0)|R(\hat{\tau})|^2 + K^2(\Delta\hat{\tau})|R(\hat{\tau})|^2$$

where $\tau$ and $\Delta\tau$ have maximized $\Lambda$; then compute $$\gamma_i = \frac{-Y + (-1)^i\sqrt{Y^2 - 4XZ}}{2X}; i = 1, 2. \quad (4)$$

and recompute the quantities a, b, c, and d first with $\gamma_1$ and then with $\gamma_2$ and for each of these sets compute $\Lambda$, repeating these steps each time discarding the smaller value of $\Lambda$.

7. The process as in claim 4 wherein the modulation waveform is a complex valued model including real and imaginary components which are used in the estimation statistic maximization process as a calibration for determining signal transmission waveform range bearing information features for use in each processing iteration.

8. A process for providing a reduced set of correlation values for a signal ranging system range estimate, comprising the steps of:

sampling of a received signal having a code modulation signal with range bearing information features including a secondary signal component at each modulation waveform transition region using a priori knowledge of a known transmitted signal wherein the sampling at the modulation waveform transition regions uses only a small subset of the received signal in code information;

averaging corresponding modulation waveform transition region samples based on statistical success of sampling relative to the range bearing information features including the secondary signal component, over a selected averaging interval; and providing an averaged sample signal to a correlation processor.

* * * * *